United States Patent
Broll et al.

(10) Patent No.: US 10,585,874 B2
(45) Date of Patent: Mar. 10, 2020

(54) LOCKING CONCURRENT COMMANDS IN A DATABASE MANAGEMENT SYSTEM

(71) Applicant: INTERNATIONAL BUSINESS MACHINES CORPORATION, Armonk, NY (US)

(72) Inventors: Bjoern Broll, Waldenbuch (DE); Sabine Perathoner-Tschaffler, Nufringen (DE); Stefan Renner, Stuttgart (DE); Knut Stolze, Hummelshain (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 692 days.

(21) Appl. No.: 15/224,696

(22) Filed: Aug. 1, 2016

(65) Prior Publication Data

US 2017/0308565 A1    Oct. 26, 2017

(30) Foreign Application Priority Data

Apr. 25, 2016   (GB) .................................. 1607147.4

(51) Int. Cl.
*G06F 16/21*    (2019.01)
*G06F 16/23*    (2019.01)

(52) U.S. Cl.
CPC ...... *G06F 16/2343* (2019.01); *G06F 16/2365* (2019.01)

(58) Field of Classification Search
CPC ......... G06F 17/30362; G06F 17/30578; G06F 17/30339; G06F 17/30371;
(Continued)

(56) References Cited

U.S. PATENT DOCUMENTS 5,717,919 A * 2/1998 Kodavalla ......... G06F 17/30339
6,631,366 B1 * 10/2003 Nagavamsi ....... G06F 17/30477
                                                                707/713
(Continued)

OTHER PUBLICATIONS

Johnson et al., "Improving OLTP Scalability using Speculative Lock Inheritance", VLDB '09, Aug. 24-28, 2009; 11 pgs.
(Continued)

*Primary Examiner* — Alex Gofman
*Assistant Examiner* — Linh Black
(74) *Attorney, Agent, or Firm* — Cantor Colburn LLP; Robert Bunker (57) ABSTRACT

Disclosed herein are methods for receiving a command for adding or removing a resource in a database and acquiring an exclusive lock for the database in response the command. In response to obtaining the exclusive lock, the method comprises determining a first number indicating the number of resources currently existing in the database and a second number indicating the number of resources subject to concurrent further commands for adding or removing a resource; comparing the first and the second number for determining whether the received command will remove the last existing resource or add a first resource to the database; and obtaining an exclusive or a shared lock for the received command in dependence on the determination. The method further includes releasing the exclusive lock for the database and adding or removing the resource while holding the lock obtained for the received command.

20 Claims, 3 Drawing Sheets

(58) Field of Classification Search
CPC ............ Y10S 707/99938; G06Q 10/06; G06Q 10/087; G06Q 10/10; G06Q 20/10; G06Q 30/0222; Y04S 10/54
USPC ......... 707/704, E17.045, 609, E17.005, 736, 707/740, 814
See application file for complete search history.

(56) References Cited

U.S. PATENT DOCUMENTS

| | | | |
|---|---|---|---|
| 6,785,881 B1* | 8/2004 | Bartz | G06F 8/34 717/110 |
| 7,024,430 B1* | 4/2006 | Ingraham | G06F 16/27 |
| 7,526,508 B2* | 4/2009 | Tan | G06F 16/21 |
| 7,788,243 B2* | 8/2010 | Pasupuleti | G06F 16/2477 707/704 |
| 7,849,098 B1* | 12/2010 | Scales | G06F 21/6218 707/781 |
| 8,170,984 B2* | 5/2012 | Bakalash | G06F 17/30457 707/603 |
| 8,745,009 B2 | 6/2014 | Ohkawa | |
| 8,924,370 B2 | 12/2014 | Shadmon | |
| 9,477,784 B1* | 10/2016 | Bhave | G06F 16/284 |
| 2004/0199530 A1* | 10/2004 | Avadhanam | G06F 16/2246 |
| 2008/0282057 A1* | 11/2008 | Layden | G06F 12/0223 711/210 |
| 2009/0177301 A1* | 7/2009 | Hayes | G11B 19/025 700/94 |
| 2009/0276473 A1 | 11/2009 | Fukuda et al. | |
| 2009/0276771 A1* | 11/2009 | Nickolov | G06F 9/4856 717/177 |
| 2010/0114841 A1* | 5/2010 | Holenstein | G06F 17/30306 707/690 |
| 2010/0284468 A1* | 11/2010 | Hayashi | H04N 19/44 375/240.16 |
| 2013/0067017 A1* | 3/2013 | Carriere | G06Q 10/06 709/208 |
| 2013/0226882 A1* | 8/2013 | Jaiswal | G06F 17/30303 707/692 |
| 2014/0278755 A1* | 9/2014 | Eberl | G06F 17/30539 705/7.29 |
| 2015/0052104 A1* | 2/2015 | Shadmon | G06F 17/30362 707/613 |
| 2015/0186266 A1* | 7/2015 | Schreter | G06F 17/30303 707/814 |
| 2015/0363458 A1* | 12/2015 | Cline | G06F 17/303 707/638 |
| 2016/0026735 A1 | 1/2016 | Cereghino | |
| 2016/0179865 A1* | 6/2016 | Bortnikov | G06F 17/30362 707/704 |

OTHER PUBLICATIONS

Microsoft "Lazy < T > Class", https://msdn.microsoft.com/end-us/library/dd642331(v=vs. 110).aspx; downloaded Mar. 22, 2016; 8 pgs.

Wikipedia "Optimistic concurrency control" https://en.wikipedia.org/wiki/Optimistic_concurrency_control; downloaded Mar. 22, 2016; 3 pgs.

Wikipedia "Two-phase commit protocol", https://en.wikipedia.org/wiki/Two-phase_commit_protocol; Downloaded Mar. 22, 2016, 5 pgs.

Yoon et al., "DBSeer: Pain-free Database Administration through Workload Intelligence", Proceedings of the VLDB Endowment, vol. 8, No. 12, copyright 2015; 4 pgs.

* cited by examiner

LOCKING CONCURRENT COMMANDS IN A DATABASE MANAGEMENT SYSTEM

FOREIGN PRIORITY

This application claims priority to United Kingdom Patent Application No. GB 1607147.4, filed Apr. 25, 2016, and all the benefits accruing therefrom under 35 U.S.C. § 119, the contents of which in its entirety are herein incorporated by reference.

BACKGROUND

The present invention relates to lock management in a database management system and more specifically, to lock management of database commands configured for adding resources to a database or for removing resources from a database.

In transaction processing and corresponding databases, a two-phase commit protocol (2PC) is commonly used to coordinate all the processes that participate in a distributed atomic transaction on whether to commit or abort (roll back) the transaction. In particular, the 2PC protocol is used to coordinate processes that concurrently operate on one or more database tables which will have a different effect on the state of a database in dependence on the (typically unpredictable) question which ones of the two commands commits first. However, the 2PC protocol is not resilient to all possible failure scenarios, and the log records used by the protocol's recovery procedures to recover from failures are typically slow to generate. The implementation of the 2PC protocol is often high complex, computationally demanding and it may introduce new problems (e.g. in-doubt transactions, i.e., transactions executed in accordance with the 2PC protocol which are affected by a system or network error during any of the phases of the 2PC protocol).

Extensive locking of databases and database tables according to other protocols may also have some disadvantages as the exclusive locking of the above mentioned concurrent database queries may significantly slow down other queries submitted to the database before said locked two queries have committed.

SUMMARY

Embodiments include computer-implemented methods, computer systems, and computer program products for handling commands acting on resources in a database management system. Aspects include receiving a command for adding a new resource in or for removing an existing resource from a database managed by the database management system and acquiring an exclusive lock for the database in response to receiving the command. In response to obtaining the exclusive lock for the database, aspects also include determining a first number of resources, the first number being indicative of the number of resources currently existing in the database and determining a second number of resources, the second number being indicative of the number of resources subject to concurrently running further commands, the further commands configured for adding a resource to the database or for removing a resource from the database. Aspects further include comparing the first number and the second number for determining whether the received command will remove the last existing resource from the database or add a first existing resource to the database and in response to determining that the received command removes the last existing resource or adds the first resource to the database, obtaining an exclusive lock for the received command. Otherwise, aspects include obtaining a shared lock for the received command. Aspects further include releasing the exclusive lock for the database and carrying out at least one or more first database statements specified in the received command on the database while holding the lock obtained for the received command, the one or more first database statements being configured for adding or removing the resource.

BRIEF DESCRIPTION OF THE DRAWINGS

In the following embodiments of the invention are explained in greater detail, by way of example only, making reference to the drawings in which.

DETAILED DESCRIPTION

Embodiments of the invention may be advantageous as in many use case scenarios, extensive locking and/or the use of the 2PC protocol may be rendered unnecessary for ensuring that no conflict can arise by concurrently executing multiple commands which may potentially remove the last existing resource from a database or create the first resource to exist in a database. Such operations could result in conflicts with other concurrently executed commands. Another potential conflict could be a command trying to create a resource having a particular resource name in the database whereby said resource name is that was already created in the integration catalogue by another concurrently executed command. An integration catalogue is a database catalogue managed by the integration module and comprising a list of resources contained in the database, whereby the integration module is updated—for a particular resource-add or resource-delete command, at a moment before or after the add- or remove-command is performed in the database. Instead of locking the whole database while executing a command that deletes or adds a resource to a database (to avoid the above mentioned potential conflict), an exclusive lock for the database is only generated for a comparatively short time, i.e., the time necessary to acquire and compare the first and second numbers for performing the determination.

Thus, the command itself may be performed in a shared lock state in case it is determined that it is impossible that the command removes the last existing resource or creates the first resource to exist in the database. The expression that "at least one or more first database statements specified in the received command are carried out on the database while holding the lock obtained for the received command" as used herein implies that it is possible that in case it is determined that it is possible that the command comprises one or more first statements which potentially remove the last existing resource or add the first existing resource to the database, only the one or more first commands may be executed under the obtained exclusive lock while other statements contained in said command, e.g. "second statements" which merely read data from the added resource, can be performed under a different lock e.g. a shared lock. Thus, a command can start with an "exclusive lock" and then switch to and continue under a "shared lock" when the command has completed the critical section comprising the one or more first statements.

Even in (the typically rare) case that it is determined that the command could potentially delete the last existing resource or add the first existing resource to a database, it is not necessary to execute all statements of the command under an exclusive lock. It may be sufficient to perform only the ones of the statements in an exclusive lock that actually add or delete a resource. Thus, the time interval during which an exclusive lock is created for the whole database is typically very short, thereby significantly increasing the performance of the DBMS without risking the database state becoming inconsistent. Such inconsistency could be caused e.g. by one concurrent command removes a resource, whereby the removal of the resource results in the dropping of the whole database with the consequence that a second concurrent command configured for creating a resource may cause an automated re-initialization of the database with wrong configuration parameters.

Embodiments of the invention may allow avoiding the introduction of an exclusive lock (e.g. a mutex) if an "add resource" (e.g. "CREATE TABLE") operation is running to ensure that any concurrent "remove resource" operation has to wait on the lock. Such an exclusive lock effectively serializes all "add resource" and/or "remove resource" operations and thereby impacts concurrency as well as performance.

In a further beneficial aspect, a performant, simple and robust locking approach is provided which does not rely on the 2PC protocol or other expensive locking schemes and may not cause problems related to "in-doubt-transactions" (a transaction is in-doubt when there is a failure during any aspect of the two-phase commit).

According to embodiments, the exclusive lock for the database is a latch. For example, the latch can be implemented by using a semaphore or a mutex.

Using latches for implementing the exclusive lock on the database for the time necessary to determine which form of lock should be chosen for the received command may be advantageous as latches are particularly well suited for blocking a command for only short periods of time, for example, the time it takes to compare some numbers. Latches avoid overhead from operating system process rescheduling or context switching. Thus, establishing a latch may be performed very quickly. The database will be blocked by the latch only for a short period of time necessary to perform the number comparison and determination. Contrary to state of the art approaches it may not be necessary any more to block the whole database while a resource (e.g. a table) is added in order to prevent inconsistent states and erroneously initialized databases as a result of one resource adding or deletion relying on catalogue information of a database catalogue that does not reflect the real current state of the database (some of the not-yet-committed concurrently executed other commands may have removed or added a resource to the database and said amendment may not have been communicated to the catalogue or vice versa: the catalog may have been updated before the actual resource number modification in the database has been performed).

According to embodiments, the method further comprises releasing the lock obtained for the received command and, upon having released the obtained lock, executing second database statements specified in the received command. The second database statements are configured for reading data from or writing data to the added resource. For example, the second database statements may comprise statements for inserting data records in the newly created resource, e.g. a table created by the first database statements of the command. Executing only the first commands under the lock for the database may be advantageous as only the critical parts, i.e., the creation and deletion of resources, is protected by the exclusive lock.

According to embodiments, the determination that the received command potentially removes the last existing resource from the database is performed already if the chances that the received command removes the last existing resource are larger than zero and smaller than one. In addition, the determination that the received command potentially adds the first resource to the database is performed already if the chances that the received command adds the first resource to the database are larger than zero and smaller than one. This means that a mere risk that the command removes the last resource or adds the first resource is sufficient for causing the selection of the exclusive lock for the command rather than the shared lock. Thus, it may happen that an exclusive lock is used although a shared lock would have been sufficient, but such "unnecessary exclusive locks" will typically be rare. Thus, embodiments of the invention may already choose an exclusive lock if there is at least a small possibility that the above-specified situation (last resource removed/first resource added) occurs as a result of performing the currently received command.

According to embodiments, the method further comprises storing the first number of resources as a first atomic variable and storing the second number of resources as a second atomic variable.

Using atomic variables (instead of e.g. latches or enqueues) for storing the resource numbers and numbers of currently executed commands may be beneficial as atomic variables efficiently and reliably ensure that a particular variable value can be accessed and optionally changed by two threads without modifying its value in an undefined manner. Latches may become wasteful if held for longer durations, as they may prevent other threads from running and require rescheduling. The longer a thread holds a lock, the greater the risk that the thread will be interrupted by the OS scheduler while holding the lock. If this happens, other threads will be left "spinning" (repeatedly trying to acquire the lock), while the thread holding the lock is not making progress towards releasing it. The result is an indefinite postponement until the thread holding the lock can finish and release it. This is especially true on a single-processor system. Thus, using atomic variables for storing the number of current resources in a database and/or for storing the number of currently executed addition commands and/or removal commands may provide for a particularly efficient method of concurrency control for stored variables.

According to embodiments, a resource is a database table, a view, a database partition, a segment, a data block and individual rows of a table. According to preferred embodiments, the resources are database tables.

According to embodiments, the DBMS is used as a target DBMS, i.e., as a DBMS receiving some data from a source DBMS, e.g. once or on a regular basis. The target DBMS manages a target catalogue. The target catalogue is a database catalogue that is indicative of the resources contained in the database. The target DBMS is coupled to an integration module configured for transferring data from a source DBMS to the target DBMS. The integration module manages an integration catalogue. The integration catalog is a database catalogue or other form of data repository that is indicative of the resources contained in the database of the target DBMS. The adding of the resource in the database and/or the removing of the resource from the database comprises updating the target catalogue and the integration catalogue under the exclusive or shared lock obtained for the command.

Using the locking approach according to embodiments of the invention in an IT-environment where an integration module manages its own instance of a database catalogue of a database of a target DBMS may be advantageous as no race conditions and inconsistencies can occur between modifying the integration catalogue and adding or removing a resource in the database of the target DBMS. A more detailed description of such distributed database systems where data is copied from a source to a target DBMS is described later using the example of an integration module (e.g. IBM DB2 Analytics Accelerator—IDAA) using a Netezza system as the target DBMS. A copy of data contained in a source DBMS (e.g. DB2 for z/OS) is stored in the target DBMS e.g. for running queries (e.g. analytical queries and other workload) in the target DBMS faster than in the source DBMS.

According to embodiments, the target DBMS is coupled to an integration module configured for transferring data from a source DBMS to the target DBMS. The integration module manages an integration catalogue. The integration catalogue is configured to indicate the resources contained in the database. For example, the integration catalogue may be implemented as a database catalogue that comprises a list and optionally also a schema definition of all the resources contained in the database of the target DBMS. The determination of the first number comprises receiving a counter value of a catalogue counter and using the received counter value as the first number. Said catalogue counter is configured for counting entries in a resource list of the resources of the database whereby the resource list is managed and kept up-to-date by the integration catalogue.

Integration modules for regularly loading data from a source to a target database and/or for dispatching database queries from the source to the target DBMS may comprise and manage their own database catalogue which lists all resources, e.g. all tables and views, contained in the target database. Thus, the integration catalogue may be considered as a "copy" or "second instance" of the database catalogue managed by the target DBMS, if any.

According to some embodiments, the integration module is configured for regularly loading data from a plurality of source databases to a respective one of a plurality of target databases managed by the target DBMS. In addition, or alternatively, the integration module is configured for dispatching database queries from the plurality of source databases to the target DBMS. In this case, the integration catalogue of the integration module comprises, for each of the target databases, a respective copy of the database catalogues of said target database. Each of said copies may be referred to as "integration catalogue" and used—with respect to its particular source and target database—as described herein for embodiments of the invention comprising a single integration catalogue.

The integration module may, upon executing a CREATE TABLE or DROP table database command for adding or removing a table in the target DBMS, at first update the integration catalogue and then actually execute the command in the target DBMS. Other systems may at first physically add or remove a table in the target DBMS and then update the integration catalogue. In any case, there exists a time interval between updating the integration catalogue and actually adding or removing a resource in the database of the target DBMS. During this time interval, several situations may occur that cause consistency problems and errors.

According to a first example, a first command CO1 may be configured for adding a table "T1" in the database of the target DBMS and may at first update the integration catalogue to indicate that table "T1" exists in the database. However, after having updated the integration catalogue, the execution of the command CO1 may be delayed for some reasons. A concurrent command CO2 that started after CO1 may also be configured for adding a table "T1" to the database and may—as a consequence of analyzing the integration catalogue—erroneously abstain from creating table "T1" as—according to the integration catalogue, said table is assumed to exist already in the database. Command CO2 may comprise a first database statement for creating table T1 (which are not executed for the above-mentioned reason) and some second database statements for storing data records in the table. When performing the second commands, an error will be thrown as the table T1 does not yet exist in the target DBMS.

According to a second example, the integration modules and/or the target DBMS may not support creating empty databases as they need some configuration data associated with individual tables in order to configure a newly created database properly. An example of this situation is the Netezza database requiring CCSID information associated with respective database tables. The term CCSID refers to "Coded Character Set Identifier", a multi-bit number that represents a specific encoding of a specific code page. As the Netezza DBMS requires the CCSID associated with a table for being able to create a database and create the table in said database, it is necessary to delay the creation of the database until the first table shall be added (lazy resource instantiation). Different tables may be associated with different CCSIDs. In a possible scenario, a first command CO1 is configured for creating a table T1 having assigned CCSID1. A second command CO2 is configured for creating a table T2 having assigned CCSID2. CO1 starts before CO2 and no database exists at the moment when CO1 starts. Although the client having submitted CO1 prior to CO2 "intended" to instantiate a database with the CCSID1 configuration, it may happen for some reason that the execution of CO1 is delayed and CO2 commits prior to CO1, resulting in the initialization of the database with a wrong CCSID2 configuration. As a consequence, it becomes necessary to guard operation CO1 and CO2 such that it is ensured that—as—depending on the execution speed of the CO1 and CO2 command, both of them may act as a command to add the first existing resource to a database (this, in this case, might not exist yet) such that it is ensured that CO1 and CO2 are executed in the chronologic order (i.e. in the order the commands were received). By assigning an exclusive lock at least on those statements within CO1 and CO2 which create a resource, it is ensured that they are executed in chronologic order and the new database is initialized with the desired configuration parameters. Embodiments may achieve this effect without performing an expensive 2PC protocol and without using an exclusive lock for the whole database for every command that creates or deletes a resource.

According to a third example, the integration module at a time t0 receives and performs a command CO1 for adding a table T1 in a database of the target DBMS. At time t0, there exists one table T3 in the database. At time t1 (which is after time t0), the integration module receives a command CO2 for removing table T3 from the database. In case CO1 is executed faster than CO2, then the existing database is maintained. If CO2 executes faster than CO1, then CO1 has to initialize a new database in the target DBMS before creating table T1. Due to the latency between updating the integration catalogue and actually performing a command in the target database, it may happen that CO1 does not "notice" that the database was dropped due to the deletion of T3 by CO2 and may try to create a table T1 although no database exists anymore. This may result in errors or system inconsistencies.

As was explained by the three examples given above, using an integration module that manages its own integration catalogue that may not always reflect current changes in the resource composition of the target database imposed by concurrently executed and not yet committed commands may bear some risks with respect to the consistency of the state of the target DBMS. By assigning an exclusive lock at least on those statements within concurrently executed commands which potentially add the first existing resource to a database or which delete the last existing resource of a database, embodiments of the invention may allow preventing said inconsistencies and errors without locking the whole database until any "add resource" or "delete resource" command has committed. The database may merely be exclusively locked for the time necessary for comparing some numbers for determining if such a problematic situation may potentially occur. For example, if the database includes one hundred tables (first number=100) and the totality of tables to be added or dropped by any of 10 concurrently executed commands is 15 (second number=15), it is saved to determine that in this situation none of said 10 commands will add the first existing resource to the database and that none of said 10 commands will remove the last resource that exists in the database. In this situation, a shared lock on the command may be sufficient, and exclusive locks may be assigned, if necessary, only on individual write statements of the command. Thus, embodiments of the invention may avoid race conditions that may occur between updating metadata catalogue maintained by the integration module in accordance with the modifications to be caused by a currently executed command and actually performing the command in the target DBMS without implementing the 2PC protocol.

According to embodiments, the received counter value is used as the first number irrespective of the correctness of the presence or absence of resources in the database indicated by the integration catalogue.

For example, even in case the integration catalogue and/or a catalogue counter used for indicating the first number is incapable of correctly and immediately reflecting the modifications of the resource composition imposed by any of the concurrently running further commands before said further command have committed, said integration catalogue or catalogue counter may safely be used without exclusively locking the whole database during adding or removing a resource. The overall locking scheme of embodiments of the invention may ensure consistent concurrency control without requiring an absolutely up-to-date value for the first number. Thus, although an integration catalogue may not be perfectly up-to date in respect to amendments imposed by non-committed commands, the catalogue may safely be used in accordance with embodiments of the invention for determining when an exclusive lock on the affected resources is necessary to avoid a potential risk of a zero-table situation. As a consequence, it may not be necessary that the counter itself or the integration catalogue uses expensive locking protocols for ensuring that the counter always correctly reflects also the modifications to be imposed by not yet committed, currently executed commands.

According to embodiments, the comparison of the first and second numbers comprises subtracting, from the first number (the number of resources currently existing in the database according to the information content of a data source, e.g. the resource list of the integration catalogue), the total number of resources to be removed or added to the database by any of the concurrently executed commands. Only in case the subtraction result is positive, the method will determine that there does not exist a risk (not even a small one) that one of the concurrently executed commands could add a first existing or delete the last existing resource.

For example, the counter value used as the first number may return "10" indicating that—e.g. according to the information contained in the integration catalogue—currently 10 resources exist in the database. The second number may indicate that the total number of resources to be added or deleted by the totality of concurrently executed commands is 10 (there may be less commands than the number of resources to be added or removed, e.g. if one command adds or removes multiple resources but for the sake of simplicity, the following examples assume that one commands corresponds to one resource-add or resource-delete event). Only in case the result of subtracting the second number from the first number is zero or negative, the obtained lock will be an exclusive lock. This is a "robust" approach as the following hypothetical embodiments demonstrate.

In one embodiment, the totality of concurrently executed commands is configured for adding 10 resources (so not a single resource-remove command exists). In this case, exclusive locking is chosen because it could theoretically happen that the first number "10" is incorrect. The first number could be incorrect as the data source providing the first number could already reflect the 10 "add resource" commands although said commands have not yet been performed in the database. In this case, it could happen that the database has not yet been initialized. That none of 10 "add resource" commands has been executed although the data source has already been modified as to indicate the existence of the 10 resources is highly improbable. The improbability rises with the number of "add resource" commands suspected of not having been performed in the database although the data source was already updated. Thus, an exclusive lock is used although it will probably not be necessary. But most of the time, the database will comprise hundreds or even thousands of tables and the situation that the first and the second number are identical thus is a rare situation.

In another embodiment, the totality of concurrently executed commands is configured for removing 10 resources (so not a single resource-add command exists). In this case, exclusive locking is chosen because it can happen that the received command will have to create the first resource to exist in the database. For example, the first number "10" could be correct. If all 10 "remove resource" commands commit before the received command starts physically adding a resource in the database, the received command could have to initialize the whole database. It could, however, also be possible that an exclusive lock is unnecessarily assigned to the received command: if, for example, the first number "10" already reflects the execution of two of the 10 "remove resource" commands (as there may have been actually 12 resources in the database at the moment of receiving the first one of the concurrently executed 10 commands, the number of resources will not fall below "2" when all 10 resource-delete commands have committed. In this case, there exist two resources when the received command starts to physically modify the database and thus does not delete or add the single remaining/existing resource to the database. Thus, even in case all concurrent commands are "resource-remove" commands and if the second number is identical to the first number, it may happen that the exclusive lock is obtained without being really necessary.

In a further embodiment, the totality of concurrently executed commands comprises 5 commands configured for removing 5 resources and comprises 5 commands configured for adding 5 resources. In this case, exclusive locking is chosen because it could happen that the first number does not yet reflect the 5 "resource-add" commands which have already been physically performed in the database without updating the data source used for providing the first number accordingly. Thus, the "real" number of resources in the database would be 5. If all 5 "remove resource" commands commit before the received command starts physically adding a resource in the database, the received command could have to initialize the whole database. It could, however, also be possible that an exclusive lock is unnecessarily assigned to the received command. For example, it could happen that the first number correctly reflects the current, "real" number of resources in the database. If all 5 "remove resource" commands and all 5 add commands commit before the received command starts physically adding a resource in the database, the received command does not have to initialize the whole database as the database will comprise 10+5−5=10 resources. Thus, it is possible that an exclusive lock is unnecessarily assigned to the received command.

The three embodiments illustrate that the comparison of the first and second number provides for a highly efficient and robust locking scheme that does not rely on a resource list of a database catalogue or other data source accurately representing the physical state of the database where the resources are to be added or removed. A shared lock is only chosen as the obtained lock if it can safely be excluded—given the information contained in the first number and in the second number—that a "zero table" situation exists when the received command executes. A "zero table situation" or, more generally, a "zero resource situation" is a situation where the last committed command removed the last existing resource or when a command for adding a resource is processed although a database to which the resource shall be added does not exist yet.

According to embodiments, the method comprises providing an addition command counter (ACC). The ACC is configured for being incremented whenever a command configured for adding one or more resources to the database starts. The increment is identical to the number of resources to be added by the command. The ACC is configured to decrease whenever a command configured for adding one or more resources to the database commits or fails. The decrease is identical to the number of resources to be added by the committed or failed command. The method further comprises providing a removal command counter (RCC). The RCC is configured for being incremented whenever a command configured for removing one or more resources from the database starts. The increment is identical to the number of resources to be removed by the command. The RCC is configured to decrease whenever a command configured for removing one or more resources from the database commits or fails. The decrease is identical to the number of resources to be removed by the committed or failed command. The determination of the second number comprising receiving a first counter value from the addition command counter, receiving a second counter value from the removal command counter, and adding the first and the second counter value for providing the second number of resources.

Determining the ACC value and the RCC value separately may be advantageous as said numbers may be used for problem diagnostics.

According to embodiments, the determination of the second number comprises subtracting the second number from the first number for computing a subtraction result. If the subtraction result is zero or negative, determining that the received command will potentially remove the last existing resource from the database or will add a first existing resource to the database. If the subtraction result is positive, determining that the received command will not remove the last existing resource and will not add a first existing resource to the database. If the ACC value and the RCC value are individually determined, the comparison of the first and second number may comprise subtracting the sum of the ACC value and the RCC value from the first number for computing the subtraction result.

According to embodiments, the method includes providing a combined command counter, the combined command counter being configured for: being incremented whenever a command configured for adding one or more resources to the database starts, the increment being the number of resources to be added by the command; being incremented whenever a command configured for removing one or more of the resources from the database starts, the increment being the number of resources to be removed by the command; decreasing whenever a command configured for adding one or more resources to the database commits or fails, the decrease being the number of resources to be added by the committed or failed command, and decreasing whenever a command configured for removing one or more of the resources from the database commits or fails, the decrease being the number of resources to be removed by the committed or failed command. The determination of the second number comprises receiving a counter value from the combined command counter for providing said counter value as the second number of resources.

According to embodiments, the method comprises using a data source for providing the first number irrespective of whether the data source correctly indicates if one of the concurrently running further commands has added or removed a resource in the database when the first number is determined and before said further command has committed.

For example, said data source could be a counter updated upon any committed resource deletion or addition or could be a resource list of a catalogue managed e.g. by an integration module.

According to embodiments, the DBMS or an integration module is configured to deny creating a database in response to receiving e a database upon receiving a CREATE database command and rather is configured to solely create a database in response to receiving a command for adding a first resource to exist in the database. This may be advantageous because some types of DBMS require configuration parameters (e.g. CCSID) which can implicitly be provided as metadata of resources and as configuration parameters within respective CREATE resource SQL statements. Thus, a database is initialized in the moment when it is implicitly ensured that the required configuration parameters are available.

Said particular way of database initialization may be advantageous as creation is deferred until the necessary information is available. Embodiments of the invention allow guarding the instantiation of resources, e.g. tables of a database, against a race conditions without employing excessive table locking and/or without using the 2CP protocol. This is particularly advantageous in a system context where a plurality of commands for adding potentially the first existing resource in a database comprise are concurrently executed, whereby the commands has different configuration parameters, and whereby it cannot be determined in advance which one of the commands will commit earliest (whereby also determining the configuration parameters of the database to be initialized).

According to embodiments, the data source is analysed for determining if the resource to be added already exists in the database irrespective of the capability of the data source to correctly indicate if one of the concurrently running further commands has added or removed said resource when the first number is determined and before said further command has committed.

According to embodiments, the DBMS is configured for automatically, upon a removal of the last resource from the database, drop the database. In addition, or alternatively, the DBMS is configured to create, upon processing a command for generating a resource in a namespace for which no database exists in the DBMS, an empty database and the resource in the database.

According to embodiments, the method includes: buffering the received command; buffering a plurality of additional commands received after the received and buffered command, each buffered additional command being configured for adding a new resource in or for removing an existing resource from the database; performing the determination that the received and buffered command will potentially remove the last existing resource from the database; upon the determination that the received and buffered command will potentially remove the last existing resource from the database, analysing all buffered commands for determining if the execution of all buffered commands will cause the number of resources in the database to decrease by at least one resource; in case of determining that the execution of all buffered commands will cause the number of resources in the database to decrease by at least one resource, performing the received and buffered command that will potentially remove the last existing resource from the database in a modified execution mode, the modified execution mode suppressing the automatic removal of the database by the DBMS upon a removal of the last resource from the database.

The other buffered commands are executed under the locks assigned to the received and buffered commands, thereby emptying the command buffer.

The predefined buffer time may be, for example, in the range of several 100 ms or even shorter in the range of 1-5 ms. The buffer time may also be command-specific. For example, if a command has to return a result in "real time" (the command or the DBMS may be configured to operate in a "real time" modus), the buffer time may be a time interval of up to 200 ns, while other, e.g. analytical commands may operate using a buffer time of about 10 ms.

The integration module may be configured for receiving database commands from a client or from an interoperable program module and for executing the received command(s) in the target DBMS. The command buffering by the integration module may comprise a queuing of any command received by the integration module.

According to embodiments, for the command that is executed in the modified execution mode, a shared lock instead of an exclusive lock is obtained (although the command was determined to potentially remove the last existing resource from the database!). This is possible because any errors and inconsistencies that may be caused by the dropping and re-creation of the whole database in a "zero-resource" situation is avoided and therefore a shared lock for the command is sufficient. Thus, by evaluating a set of buffered commands and their "net effect" on the resource number of the database before starting executing any of the buffered commands, it is possible to prevent expensive database drop and re-create operations and to prevent any conflicts these operations may cause. Moreover, as the command in the modified execution mode is performed under a shared lock, other commands may be allowed to execute which would be blocked in case an exclusive lock would have been assigned to the received command. It should be noted that the buffering may selectively be applied for received commands comprising a resource-add or a resource-delete statement and that for determining the "net effect" of the buffered commands an evaluation of the number of existing resources is performed only in so far as the first number of resources is evaluated for determining if a currently received and buffered command may potentially remove the last existing resource.

For example, the database may comprise (according to the first number derived from the integration catalogue), two tables, there exists one concurrently executed remove table command (imposing an uncertainty if the actual resource number is one, two or three) and a currently received command C1 configured for deleting one of the tables. The command C1 and a further command C4 (that is received after C1) are buffered before they are executed. The further command C4 may be a command that adds a new resource, so the net effect of both commands C1+C4 is zero and as one table still exists in the database, the net effect of the two commands C1+C4 will not reduce the number of resources to zero. The integration module may execute the command C1 in a modified mode in which the database is not deleted as the integration module "knows" that a new database (with the same configuration parameters as the existing database) would have to be created when C4 is executed, so the command C1 is executed in a special mode that suppresses the automated drop database functionality. Likewise, the command C4 is executed in a special mode that suppresses the automated re-create database functionality.

According to embodiments, the method includes: buffering, by one or more buffering threads, the received command; buffering, by the one or more buffering threads, a plurality of additional commands received after the received and buffered command, each buffered additional command being configured for adding a new resource to or for removing an existing resource from the database; performing, by an analytical thread, the determination that the received and buffered command will potentially remove the last existing resource from the database; upon the determination that the received and buffered command will potentially remove the last existing resource from the database, analysing, by the analytical thread, all buffered commands for determining if the execution of all buffered commands will cause the number of resources in the database to decrease by at least one resource; in case of determining that the execution of all buffered commands will cause the number of resources in the database to decrease by at least one resource, performing, by two or more first worker threads, the ones of the buffered commands configured for adding one or more resources to the database in parallel; and after the last one of the commands performed by the first worker threads has committed, performing, by two or more second worker threads, the ones of the buffered commands configured for removing one or more resources from the database in parallel.

The above identified features may be beneficial as they may ensure that in some cases, a zero-resource situation (e.g. a situation where the database is automatically dropped by a DBMS because the last table contained therein was deleted) can be avoided. This may result in a reduction of CPU and memory consumption for handling such a zero-resource situation. If multiple "add resource" and "remove resource" commands are received within a time interval, e.g. several hundred milliseconds, one or more seconds or one or more minutes, embodiments of the invention re-order the buffered commands such that resource-add commands and resource-remove commands are performed by different, subsequent sets of worker threads. As the add-resource commands are executed prior to the remove resource commands and the remove resource commands are allowed to start only the last one of the buffered add-resource command committed, there will not arise a zero-resource situation when executing the buffered commands provided that the net effect of executing the buffered commands does not reduce the number of resources in the database.

Moreover, said features may be advantageous as no latches are necessary for providing an exclusive lock on the whole database while performing the determination which lock type should be obtained for a particular command. This may allow avoiding operating system calls (mutex/locks) and thus may increase performance as the thread for determining the type of lock is separated from the threads and queues used for executing the commands. Individual commands are assigned to different queues and corresponding worker threads for parallel or non-parallel execution and in particular for scenarios with a high number of commands that can be executed in parallel, e.g. commands solely comprising SELECT statements, the avoidance of latches may significantly improve performance.

Optionally, the suppression of the automated database dropping or re-creation and/or the use of the threads mentioned above for performing buffered commands may comprise checking if any of the buffered add-resource commands would if executed in a "zero-resource" scenario for adding the first existing resource to the database, create the database in the same manner and with the same configuration parameters as used for the database that was automatically dropped upon performing the last resource-remove command. For example, the checking could comprise determining if the add-resource commands to be sorted have assigned the same CCSID and would thus instantiate a database with the same CCSID configuration parameters. Two add-resource commands are sorted and re-ordered only in case they are determined to create the database in the same manner. Then, each of the sorted and reordered commands would be received individually and for each of the reordered commands, it would be determined individually, as described for embodiments of the invention, if an exclusive lock or a shared lock shall be obtained.

According to embodiments, the received command is one of a set of commands for adding a resource to the database and/or for removing a resource from the database. The method comprises performing the method of any one of the embodiments described herein for each of the commands of the set. The database statements of resource-add or resource-remove commands which will not cause a zero-resource situation are executed in the shared lock having been obtained for said type of commands. The commands for which an exclusive lock was obtained as well as the commands for which a shared lock was obtained are executed in accordance with a starvation-free execution schema.

The totality of shared-locked and exclusively locked commands (or at least their respective first database statements actually carrying out the adding and removing of the resources) are carried out in accordance with a starvation-free execution schema.

The starvation-free implementation of the execution of a plurality of commands (or at least their respective first database statements) for which a shared lock and an exclusive lock was obtained may be illustrated with the following scenario: (a) a first command CO1 obtains a shared lock; (b) another command CO2 received later than CO1 waits and obtains an exclusive lock, and now a new command CO3 is received; (c) upon receiving the third command CO3, the method determines that a shared lock is sufficient and CO3 obtains a shared lock for execution. The new command CO3 must not run together with the command CO1 received in (a) because the other command CO2 received in (b) may change the underlying resource being protected by the exclusive lock of CO2. If the shared/exclusive lock is implemented starvation-free, it means that the command CO3 in (c) will wait until the command CO2 has committed. To be more particular: at least the first database statements of command CO3 will wait until at least the first database statements of command CO2 having obtained the exclusive lock have committed. Since the comparison of the first and second number and the determination if a received command will potentially add the first existing resource to the database or remove the last existing resource from the database is always performed while the database is exclusively locked via said latch and the shared/exclusive lock for a particular command is acquired while the short time exclusive lock on the database is held, it is guaranteed that the command CO3 in (c) (or at least the first database statements contained therein) cannot "jump ahead" of the command CO2 in (b).

A "database" as used herein is an organized collection of data. The data is typically organized in tables. According to some embodiments, the database is a relational database, in particular, a column-oriented database or a row-oriented database.

A "database management system (DBMS)" as used herein is a software application designed to allow the definition, creation, querying, update, and administration of databases. Examples for DBMSs are IBM DB2 for zOS, MySQL, PostgreSQL and others.

A "resource" as used herein is a database object for which a lock can be defined. A resource can be, for example, a database table, a view, a database partition, a segment, a data block and individual rows of a table. According to preferred embodiments, the resources are tables.

A "command" as used herein is a database query that comprises one or more database statements. The one or more database statements may be performed in one or more transactions. For example, the command may comprise some write statements for creating or modifying a resource and some subsequent read statements for reading data from the created or modified resource. Each command may correspond to a transaction.

A "lock" as used herein is a synchronization mechanism for enforcing limits on access to a resource in an environment where there are many threads of execution. A lock is designed to enforce a defined concurrency control policy. Within a database, locks can be granted over a database or over different database resources, e.g. tables, partitions, segments, blocks and rows. Locks can be of different types. Some non-limiting examples are as follows: a) When a resource is read, a Read Lock may be used to prevent an update of the resource data while the resource data is being retrieved. b) When a resource is updated, a Write Lock may be used to prevent processes relating to other commands from reading or updating the resource data at the same time. c) When a new resource is added, a Write Lock may be used to prevent processes of other commands from adding or using the same resource at the same time.

An "exclusive lock" or "write lock" as used herein is a lock that is associated with a database resource by a command ("the command locks the resource," or "acquires lock for it") before writing (inserting/modifying/deleting) this resource. An existing write-lock on a database resource blocks an intended write upon the same resource (already requested/issued) by another command by blocking a respective write-lock from being acquired by the other command. The second write-lock will be acquired and the requested write of the resource will take place (materialize) after the existing write-lock is released. A write-lock blocks an intended (already requested/issued) read by another command and also any write operation by another command on said resource. According to embodiments, an exclusive lock is implemented as a latch or as an enqueue (both of which can be implemented as semaphores).

A "shared lock" or "read lock" as used herein is a lock that allows concurrent access for read-only command and corresponding operations. A shared lock is associated with a database resource by a command before reading (retrieving the state of) this resource. A shared-lock blocks an intended write by another command by blocking the respective write-lock. A shared-lock does not block an intended read by another command. The respective shared-lock for the intended read is acquired (shared with the previous read) immediately after the intended read is requested, and then the intended read itself takes place. Concurrent execution of read and write commands and corresponding transactions is prohibited as write operations require exclusive access. If a shared lock is obtained for a resource, multiple commands can read the data in the resource in parallel but an exclusive lock is needed for writing to or modifying the resource. When a writer is writing the data, all other writers or readers will be blocked from accessing said resource until the writer is finished writing.

A "lock obtained for a command" as used herein is a lock that is created for a particular command and exists as long until the command commits. It comprises a list of resource names that are or will be accessed by the command upon being executed and specifies the limits enforced by said lock on access to the listed resources in an environment where there are many threads of execution.

A "lock obtained for a database" as used herein is a lock that is created for a particular database, that comprises a list of resource names that are or will be accessed by the command upon being executed and that specifies the limits enforced by said lock on access to the listed resources in an environment where there are many threads of execution.

A "thread" as used herein is a basic unit of CPU utilization, typically consisting of a program counter, a stack, a set of registers, and a thread ID.

An "atomic variable" as used herein is a type of variable that is stored in a data storage that uses hardware-means for ensuring that once a process starts reading or writing it, nothing else can interrupt said process, i.e. nothing can split the process of accessing atomic variable into two. For example, the majority of modern CPU architectures has instructions that allow locking FSB (Front Serial Bus, i.e., the bus that processor use to communicate with RAM) while doing some memory access. An atomic variable can be, for example, a variable, e.g. an Int or a Long, that upon being accessed causes a locking of the FSB, thereby preventing any other processor (core), and process running on that processor from accessing RAM. Thus, atomic variables may be used reliably and efficiently preventing concurrent access to the first and second numbers. According to embodiments, also the ACC and/or the RCC values are stored as atomic variables.

A "latch" or "spin lock" as used herein is an exclusive lock which causes a command trying to acquire it to simply wait in a loop ("spin") while repeatedly checking if the lock is available. Since the thread remains active but is not performing a useful task, the use of such a lock is a kind of busy waiting. Once acquired, a latch will usually be held until it is explicitly released.

The expression "adding a first existing resource to the database" as used herein means adding a resource to a database at a moment when the database is devoid of any resources or at a moment when the database itself does not even exist.

Figure 1:
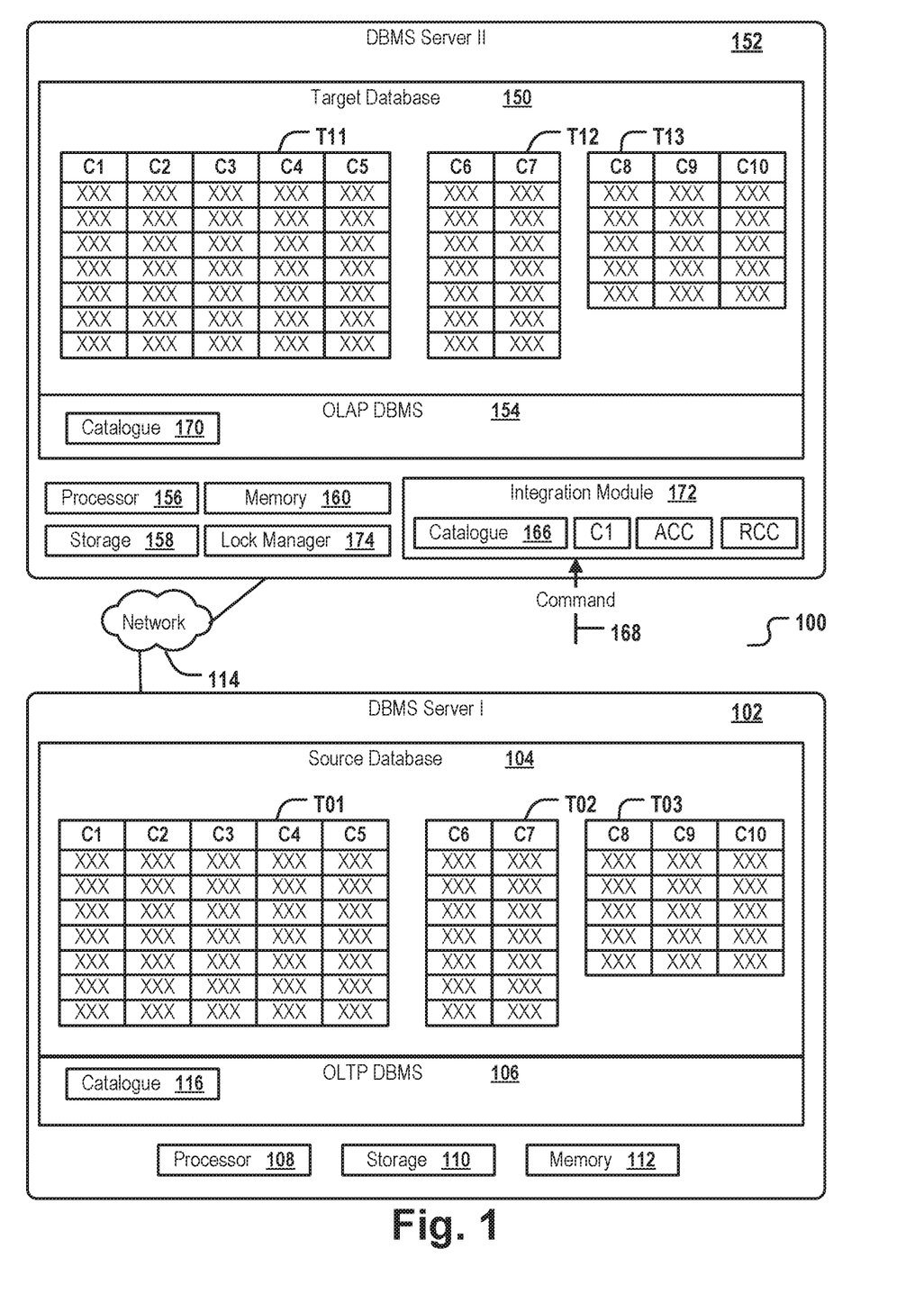
FIG. 1 depicts a distributed database system comprising a source database management system (DBMS), a target DBMS, and an integration module in accordance with an embodiment.

FIG. 1 depicts a distributed database system 100 comprising a source DBMS 106, a target DBMS 154 and an integration module 172.

The integration module is responsible for regularly copying data of one or more tables T01, T02, T03 from a source database 104 managed by the source DBMS 106 to a target database 150 managed by the target DBMS 154. The integration module comprises and is configured to manage an integration catalogue 166 that comprises a list of database tables and other resources of the target database 150. The catalogue 166 is updated when a resource has been added to our removed from the target database. The update may be executed after or before the resource is actually added or removed from the database, so there exists an uncertainty whether the catalogue reflects the resources that physically exist in the database until the command having added or removed a resource has committed.

The source DBMS 106 comprises and is configured to manage a source database catalog 116. The catalog 116 comprises a list of tables and other resources being managed by the source DBMS 106. The source DBMS is hosted on a first database server 102 comprising one or more processors 108, a non-volatile storage medium 110 and a main memory 112. The storage 110 may comprise computer readable instructions implementing the source DBMS 106.

The target DBMS 154 is hosted on a second database server 152 comprising one or more processors 156, a main memory 160 and a non-volatile storage medium 158. The storage medium 158 comprises computer interpretable instructions implementing the target DBMS. Optionally, according to some embodiments, the target DBMS 154 comprises and is configured to manage a target database catalog 170. The target database catalog 170 indicates the number, names and other meta-data of tables and other resources contained in a managed by the target DBMS 154.

The target DBMS further comprises a lock manager module 174 configured to provide exclusive locks, e.g. latches, and shared locks for individual resources of the target database 150 and for commands running on said database resources for concurrency support. Internally each lock can have a queue that contains all commands having been suspended by said lock. The integration module is interoperable with the lock manager, i.e., may use the lock manager for locking the database or individual commands. Alternatively, the lock manager used for controlling the database and command locks may be part of the integration module.

The lock manager can comprise an interface allowing commands executed by the integration module 172 or the DBMS 152 to request, upgrade, and release locks. The lock manager may be configured to ensure that commands acquire proper intention locks, performs deadlock prevention and detection, and manages storage for lock state.

The method for managing commands and their locks as described herein for embodiments of the invention can be implemented in and be performed by the integration module 172. The integration module 172 is interoperable with the lock manager module 174 and may provide any received commands or data derived from the received commands (e.g. the second number of resources) to the lock manager. In addition, the integration module may comprise or may be interoperable with a counter for determining the first number of resources. The integration module forwards the first and second number to the lock manager for enabling the lock manager to compare the first and second numbers and for obtaining a shared or exclusive lock for a particular command.

According to other embodiments, the method is performed not by an integration module but by another program module that may be part of the DBMS or may be a plug-in or application program that is interoperable with the DBMS. The other program module is configured for interoperating with the lock manager module 174 as described above for the integration module.

According to some further embodiments, said program module is part of the lock manager module 174. In this case, the lock manager 174 is configured to perform the method for managing commands and obtaining locks as described herein for embodiments of the invention.

The resource list of the catalogue 170 of the target database may be used as a data source for receiving the first number of resources irrespective of whether the catalogue 170 is able to correctly reflect the adding or removal of a resource from the target database by a currently executed and not yet committed command (as described analogously for the embodiments where the integration module 172 uses the integration catalogue 166 as a data source for providing the first number of resources).

The first and the second DBMS server are connected to each other via a network 114, e.g. the Internet or an intranet. The integration module 172 is depicted as being hosted by the target database server 152, but it is also possible that the integration module is hosted by a different computer system and/or that the source DBMS and the target DBMS are hosted on the same database server or other type of computer system.

Typically, the source DBMS is speed optimized for performing a particular type of database queries, for example for transactional (e.g. insert, update and delete) database queries while the target DBMS is speed optimized for performing a different type of database queries, for example, OLTP (SELECT) database queries. For example, the source DBMS could be an OLTP DBMS and the target DBMS could be an OLAP DBMS. However, any other possible combination of two DBMSs of the same or of different type can be used, e.g. row-store-based DBMSs, column-store-based DBMSs, triple stores, document-centric DBMSs, spatial DBMSs etc.

According to one embodiment, the source DBMS is IBM DB2 for z/OS and the target DBMS is Netezza used in combination with the IBM DB2 Analytics Accelerator (IDAA), whereby IDAA acts as the integration module 172 and stores a copy of the data contained in a source database in the source DBMS 106 in a corresponding target database 150 of the target DBMS 154. Moreover, the integration module is configured to run database queries and other workload in the Netezza DBMS for better performance for the analytical workload. For each source database 104 of a connected DB2 source DBMS 106, the integration module creates a respective "target database" 150 in the target DBMS. Due to dependencies of database configuration from metadata associated with individual resources (e.g. CCSIDs assigned to the tables to be added to a Netezza database), the integration module delays the creation of the corresponding target/Netezza database until a command is received by the integration module or the target DBMS to add (i.e. create) the first table to the corresponding (and not yet existing) target database. In response to this command, the command receiving instance creates the table in the target DBMS. As a consequence, it becomes necessary to guard the command for adding a new table to the Netezza database against other commands which may also add a table but potentially with different CCSID configuration settings and against other commands which might remove the last table of an existing target database. Otherwise, it could happen that a "remove table" operation removes the last table while a concurrent "add table" commands adds another table. In this case, the "add table" command has to create a new Netezza database in case the remove completed before it—and it does not have to create a new database in case the "add table" is a tiny bit faster than the "remove table" command.

An additional problem may arise from the fact that the integration module (IDAA) maintains its own metadata of the tables in the target database, e.g. in the form of the "integration catalogue" 166. The integration catalogue contains a list of tables (and optionally other resources) existing in the target database 150. That list is used, for instance, when determining whether the received and currently evaluated command will remove the last existing table from the target database (and the Netezza database shall be dropped) or whether the command will add the first table to exist in the target database (and the Netezza database has to be created). The Netezza DBMS itself maintains its own metadata repository, e.g. database catalogue 170, and knows about its existing databases and tables. Due to the two maintained metadata repositories 166, 170, race conditions can occur in between adding the table information to the integration catalog 166 and creating it in the catalogue 170 of the Netezza database.

Instead of introducing an exclusive lock (e.g. a mutex) on the whole database 150 if an "add table" or "remove table" command is received and maintaining the lock until said command has committed, embodiments of the invention may merely impose a short exclusive lock, e.g. a latch, on the whole target database 150 while determining if the currently received command 168 (or at least the add-table or remove-table statements contained therein) should be executed while having assigned a shared lock or an exclusive lock. After having determined if a shared or an exclusive lock should be obtained for executing the received command, the short exclusive lock on the whole database is released and the received command is executed in the obtained lock mode which—in many cases—will be a shared lock mode which does not impose as many delays and restrictions to other concurrent commands as an exclusive write lock and may thus result in an acceleration of command processing. Thus, using an expensive 2PC lock to correctly handle and synchronize the update for two database catalogues 166, 170 may be avoided. It has been observed that using the method according to embodiments of the invention may allow running several 100 s or 1000 s of "add table" commands and "remove table" commands per hour while the performing of the same number of commands under 2PC conditions has resulted in severe performance problems.

Embodiments of the invention use "shared" locks if possible, and use an "exclusive" lock if there is no guarantee that concurrent operations may interfere, i.e., if the current command might potentially remove the last existing resource from a database or add the first existing resource to the database. Adding new tables to a Netezza database if there is already at least 1 other table does not cause any issues. Multiple such operations could run concurrently without conflicts because the prior existence of other tables guarantees that the Netezza database exists. Likewise, "add table" and "remove table" operations (working on different tables) can run concurrently as long as the Netezza database does not have to be dropped (due to the last table being removed) or created (due to the first table being added). Embodiments of the invention determine—under a short exclusive lock—if the currently received command is guaranteed to be executed under said unproblematic conditions. In this case, embodiments use "shared" lock mode for the received command. Multiple concurrent commands can obtain and share a "shared" lock, but no two concurrently executed commands can obtain and hold the same lock in "exclusive" mode. The question if the currently received command is guaranteed to be executed under said unproblematic conditions depends on the current workload, i.e., depends on the number of resources already existing in the database, and on the number and type of currently executed "add-resource" or "remove-resource" commands. Examples of said "unproblematic conditions" are just removing 1 out of 100 existing tables, or adding new tables if there are already 20 tables. Such commands can be executed concurrently.

According to the embodiment depicted in FIG. 1, three counters C1, ACC and RCC are used for determining the first number of resources existing in the database 150 and for determining the number of resources to be added or removed by the totality of commands which are concurrently executed in the DBMS 154 at the moment when the command is received by the integration module 172 or another module operatively coupled to the DBMS 154. Those counters C1, ACC, RCC can be implemented and managed in a central location, e.g. as a sub-module of the integration module 172 or as a sub-module or plug-in of the lock manager 174 module. A first counter C1 counts all tables currently existing in the Netezza database 150. The second counter ACC counts the number of tables that are currently being processed by all "add table" commands. The third counter RCC counts the number of tables that are currently being processed by all "remove table" commands. The first counter C1 can be implemented by simply counting the entries in the list of tables in the integration catalog 166. Another alternative is to use a separate counter, which introduces redundant information. The ACC and RCC counter can be implemented by a program routine (e.g. of the integration module or of the lock manager) configured to analyse each currently executed or queued command for determining if the command is an "add-table" command or a "remove-table" command and for determining the number of tables to be added or removed by the command. Of course, other types of resources than tables may likewise be used, e.g. table partitions provided the catalogues 166 170 update the metadata on the level of individual partitions. Whenever an "add table" command starts, it increments the ACC by the number of tables to be added by this command. Once the table is added to the IDAA catalog and the Netezza system or if the "add table" operation fails, B is decremented again by the same number.

Likewise, when a "remove table" command starts, it increments RCC by the number of tables to be removed from the database 150. When the "remove table" command has completed removing the table or has failed, RCC is decremented.

As described previously, race conditions may occur between the updating of the integration catalogue and the adding or removal of resources to or from the database 150. For example, due to a 2-staged approach used by IDAA when adding tables (first adding a metadata record for the table to the IDAA catalog 166, then actually creating the table in the Netezza system), it can happen that: a) the table was already added to the IDAA catalog 166, but not yet created in the Netezza database 150—and the Netezza database may not yet exist either in case the first existing table shall be added; or b) the table was already removed from the IDAA catalog 166, but the table still physically exists in the Netezza database 150 at the moment when the last table and the whole database 150 shall be removed. Thus, the first counter C1 may already include tables that are currently being added because they already exist in the IDAA catalog 166. Similarly, for tables being removed it may happen that the counter C1 already accounts for them—or maybe not. Therefore, the first counter C1 has an uncertainty reflecting the various potential race conditions between "add table" and "remove table" operations while the "add table" and/or "remove table" operations are in progress.

Thus, the "second number" of resources by concurrently running add-resource or remove-resource commands may be the sum of the counter values returned by ACC and RCC. Thus, according to one embodiment, the comparison of the first and second number may be implemented by computing the result of the formula "Difference D=C1-value-(ACC-value+RCC-value). However, it is also possible that a single counter C2 is used for counting the totality of resources to be added or removed by the currently executed commands. If the resulting value D is less than 1, there is a risk that the last existing resource is removed and/or the first existing resource has to be added to the database 150 and that the Netezza database has to be removed and/or created, and an exclusive lock is required to protect this operation. The resulting value D can become negative. For example, C1=10 because 10 tables currently exist or are in progress of being created. ACC=5 because 5 tables are in progress of being created. Those 5 tables may or may not have been accounted for by the first counter C1. At the same time, RCC=8 because 8 tables are removed. 10-5-8=-3. Embodiments of the invention may guarantee that a "shared" lock is used if it is absolutely safe to do so. It does not guarantee that an "exclusive" lock is only used if it is really necessary. It may happen that an "exclusive" lock is used unnecessarily. For example, if C1=10 and ACC=5 and BCC=5 (add 5 new tables and remove 5 of the originally existing 10), will trigger the use of an "exclusive" lock—even if the "add table" and "remove table" operations are not problematic at all. However, in a typical situation several 10.000 s tables exist in the target database 150 and are listed in the catalogue 170, and only a few 1000 s of tables are added and removed concurrently. Thus, the value for "C1-(ACC+RCC)" is typically much larger than 0. Hence, the majority of the operations will use a "shared" lock, and concurrency for such operations is maximized.

Thus, the use of exclusive locks for the received command does not only depend on the type of the received command (affecting the number of resources or just modifying the data content of a resource) but also on the type of concurrent commands and on the number of resources existing in the target database. It is neither sure that a statement using an exclusive lock really does create or remove the first or last table, nor can it be a priori known in all cases that a statement will use a shared or an exclusive lock.

Figure 2:
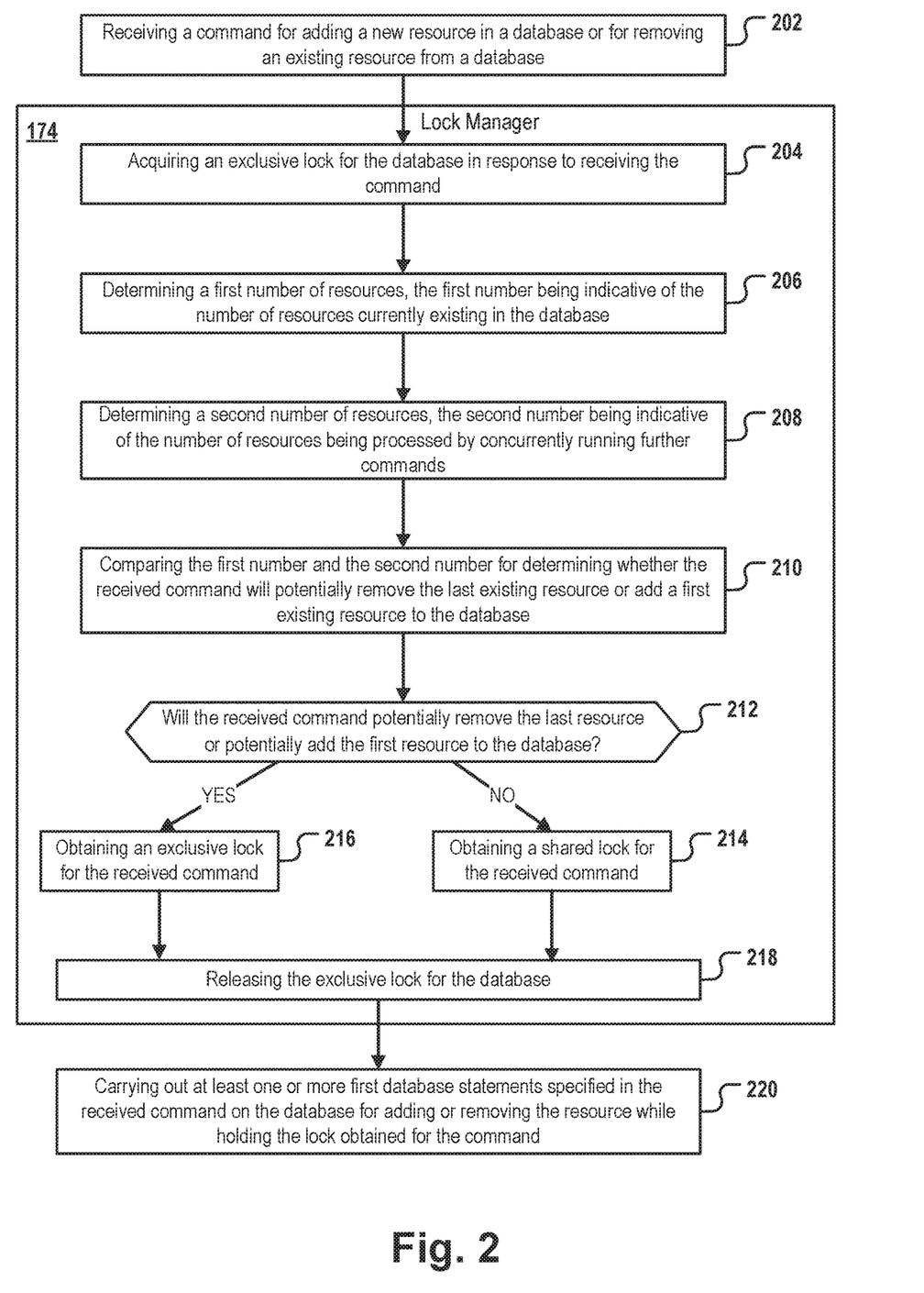
FIG. 2 depicts a method for managing and locking commands in a database in accordance with an embodiment.

FIG. 2 depicts a method for managing and locking commands in a database. The method may be implemented by an integration module 172 configured for copying data from a source to a target DBMS and/or configured for dispatching database queries from a source to the target DBMS. Alternatively, the method may be implemented by another program module operatively coupled to the DBMS. The DBMS can be a stand-alone DBMS or can be a target DBMS of a distributed database system as depicted in FIG. 1. The integration module or the other program module can be operatively coupled with a lock manager module 174 of the DBMS. In some embodiments, the lock manager module 174 and the integration module may be configured to interoperate e.g. for determining the first and second numbers, for determining which type of lock should be obtained for a particular command and for enforcing the locks. In the following, the method is described by making reference to the integration module but the method could likewise be performed by other modules operatively coupled to the DBMS 154. The method includes, as shown at block 202, receiving a command 168 for adding a new resource, e.g. a new table "T13", in the database 150 or for removing an existing resource e.g. table "T11" and/or "T12" from the database 150. As shown at block 204, the lock manager 174 acquires an exclusive lock for the database 150 in response to receiving the command.

Next, as shown at block 206, in response to having obtained the exclusive lock for the whole database 150, an integration module 172 that comprises or is interoperable with the lock manager 174 determines a first number of resources, the first number being indicative of the number of resources currently existing in the database. As shown at block 208, the integration module determines a second number of resources. The second number of resources is indicative of the number of resources subject to concurrently running further commands (which may or may not have physically performed the adding or removing of the resource at the moment of obtaining the second number). The further commands are configured for adding a resource to the database or for removing a resource from the database. As shown at block 210, the integration module compares the first number and the second number for determining whether the received command will potentially remove the last existing resource from the database or add the first existing resource to the database. In response to determining, as shown in block 214, that the received command potentially removes the last existing resource from the database or adds the first resource to the database, the integration module, as shown at block 216, obtains via the lock manager an exclusive lock for the received command. Otherwise, the integration module, as shown at block 214, obtains a shared lock for the received command. As shown at block 218, the integration module releases the exclusive lock for the database and carries out, as shown at block 220, at least one or more first database statements specified in the received command on the database while holding the lock obtained for the received command. The one or more first database statements are configured for adding or removing the resource.

Figure 3:
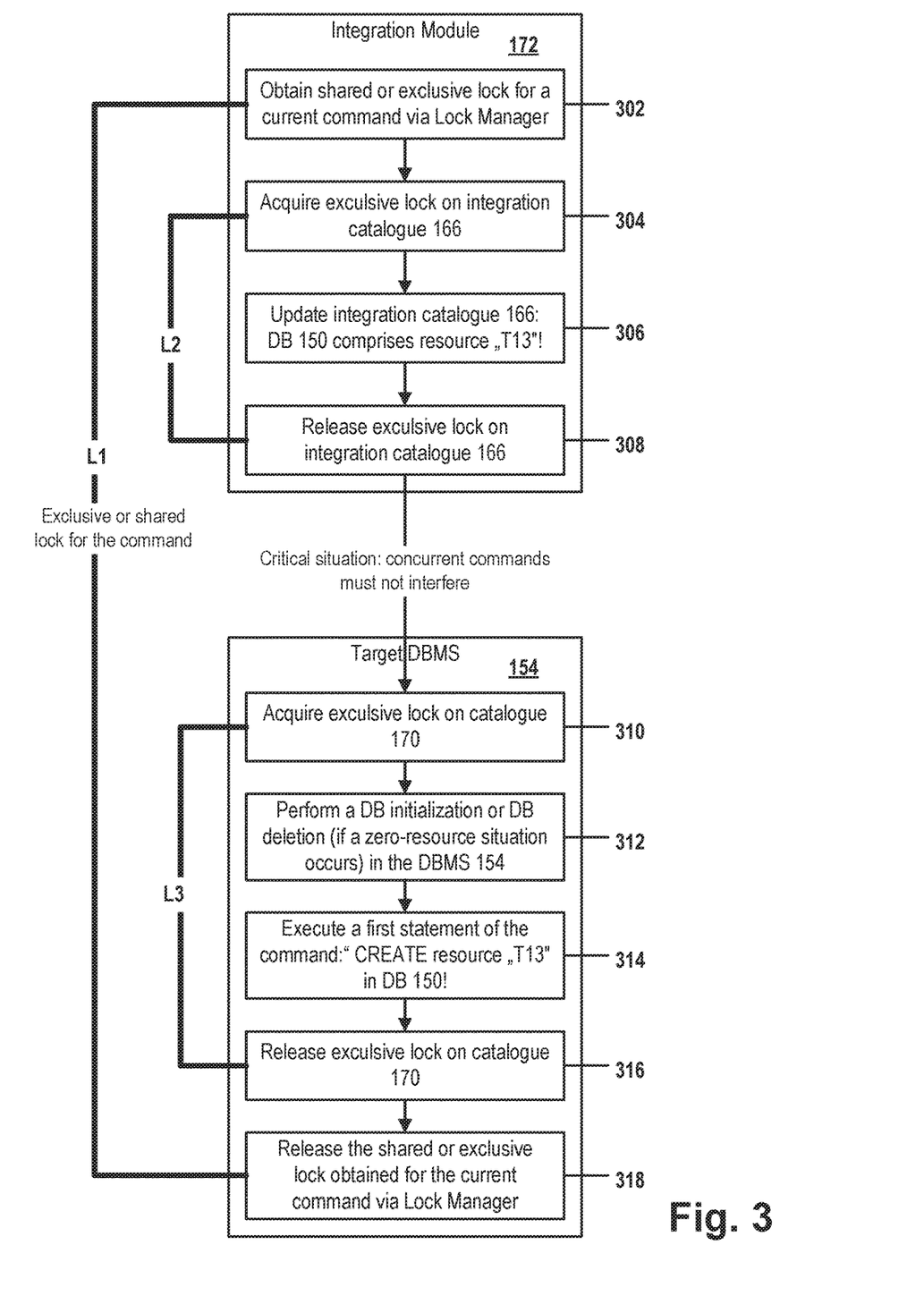
FIG. 3 depicts the execution of a command for which a lock was obtained in accordance with an embodiment.

FIG. 3 depicts the execution of a command under a shared or an exclusive lock L1 having been obtained for said command in dependence on comparing a first and second number of resources as described for embodiments of this invention.

The integration module 172 and the target DBMS may independently from each other manage at least some of their operations and corresponding locks. The integration module and the target DBMS may be configured such that upon receiving a command for creating a new resource in the target database 150, e.g. upon receiving a command for creating a new table T13, in a first operation the integration catalogue 166 is updated to indicate that the target database comprises a table T13, and may be configured such that in a second operation subsequence to the first operation the new table T13 is actually created in the target database. Thus, there may exist a time interval during which the integration catalogue already comprises an entry for table T13 while this table does not yet exist in the target database. The situation is problematic as the integration catalog is assumed to comprise a correct list of the resources, e.g. database tables, currently contained in the target database. Errors may occur during said "critical time interval") if a concurrently executed command evaluating the integration catalogue 166 wrongly assumes that the table T13 exists already in the target database 150. During the "critical time interval", this assumption is wrong, because the integration catalogue 166 is updated in block 306 before the actual physical operation, e.g. the creation of the new table T13, is actually carried out by the integration module in the target database 150 in block 314. The lock L2 obtained in block 304 and released in block 308 merely protects the block 306 for updating the integration catalogue 166 by adding an additional record to the resource list for the new table T13. Analogously, the lock L3 obtained in block 310 and released in block 316 merely protects the block 312 for initializing the target database 150 in case table T13 is the first table to be created (or, in case of a drop table command for the last existing table, for dropping the database 150) and block 314 for actually, physically adding the new table T13 to the target database. The block 312 is only executed in case of a "zero-resource situation". By obtaining the lock L1 that spans multiple operations including the integration catalogue update block 306, the actual resource creation or removal block 314 in the target database and the optional database initialization or removal block 312, errors during the critical time interval may be prevented.

It is possible that all statements contained in the command to which the shared or exclusive lock is assigned in block 302 are executed before the lock is released in block 318. Alternatively, it is possible that the command comprises a first database statement for actually adding (or removing) a resource and one or more second database statements which do not change the number of resources but rather read the resource or insert additional data records to the resource. In some embodiments, the second statements can be executed after the lock has been released in block 318.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for handling commands acting on resources in a database management system, the method comprising:
   receiving a command for adding a new resource in or for removing an existing resource from a database managed by the database management system;
   buffering the received command, wherein the buffer time is command specific;

acquiring an exclusive lock for the database in response to receiving the command;

in response to obtaining the exclusive lock for the database:

determining a first number of resources, the first number being indicative of the number of resources currently existing in the database;

determining a second number of resources, the second number being indicative of the number of resources subject to concurrently running further commands, the further commands configured for adding a resource to the database or for removing a resource from the database, wherein the second number is operable for subtracting from the first number;

comparing the first number and the second number for determining whether the received command will remove the last existing resource from the database or add a first existing resource to the database;

in response to determining that the received command removes the last existing resource or adds a first resource to the database, obtaining an exclusive lock for the received command;

in response to determining that the received command does not remove the last existing resource or adds the first resource to the database, obtaining a shared lock for the received command; and releasing the exclusive lock for the database.

2. The computer-implemented method of claim 1, wherein the exclusive lock for the database is a latch.

3. The computer-implemented method of claim 1, further comprising:

releasing the lock obtained for the received command; and upon having released the lock obtained for the received command, executing second database statements specified in the received command, the second database statements configured for reading data from or writing data to the added resource.

4. The computer-implemented method of claim 1, wherein:

the determination that the received command removes the last existing resource from the database being already performed based on a determination that a probability that the received command removes the last existing resource is larger than zero and smaller than one; and the determination that the received command adds the first resource to exist in the database already based on a determination that a probability that the received command adds the first resource to exist in the database is larger than zero and smaller than one.

5. The computer-implemented method of claim 1, further comprising:

storing the first number of resources as a first atomic variable; and storing the second number of resources as a second atomic variable.

6. The computer-implemented method of claim 1, further comprising carrying out at least one or more first database statements specified in the received command on the database while holding the lock obtained for the received command, the one or more first database statements being configured for adding or removing the resource.

7. The computer-implemented method of claim 1, wherein the database management system is a target database management system managing a target catalogue being indicative of the resources contained in the database, the target database management system is coupled to an integration module configured for transferring data from a source database management system to the target database management system, the integration module managing an integration catalogue being indicative of the resources contained in the database, and the adding of the resource in the database and the removing of the resource from the database comprising updating the target catalogue and the integration catalogue under the shared or exclusive lock obtained for the command.

8. The computer-implemented method of claim 1, wherein:

the database management system is coupled to an integration module configured for transferring data from a source database management system to the database management system, the integration module managing an integration catalogue being indicative of the resources contained in the database; and the determination of the first number comprising receiving a counter value of a catalogue counter and using the received counter value as the first number, the catalogue counter being configured for counting entries in a resource list of the resources of the database, the resource list being managed and kept up-to-date by the integration catalogue.

9. The computer-implemented method of claim 1, the method comprising:

providing an addition command counter that is incremented whenever a command configured for adding one or more resources to the database starts, the increment being the number of resources to be added by the command, the addition command counter being configured to decrease whenever a command configured for adding one or more resources to the database commits or fails, the decrease being the number of resources to be added by the committed or failed command;

providing a removal command counter that is incremented whenever a command configured for removing one or more resources from the database starts, the increment being the number of resources to be removed by the command, the removal command counter being configured to decrease whenever a command configured for removing one or more resources from the database commits or fails, the decrease being the number of resources to be removed by the committed or failed command; and the determination of the second number comprising receiving a first counter value from the addition command counter, receiving a second counter value from the removal command counter, and adding the first and the second counter value for providing said counter value as the second number of resources.

10. The computer-implemented method of claim 1, the method comprising:

providing a combined command counter configured for:

being incremented whenever a command configured for adding one or more resources to the database starts, the increment being the number of resources to be added by the command, being incremented whenever a command configured for removing one or more of the resources from the database starts, the increment being the number of resources to be removed by the command, decreasing whenever a command configured for adding one or more resources to the database commits or fails, the decrease being the number of resources to be added by the committed or failed command, and decreasing whenever a command configured for removing one or more of the resources from the database commits or fails, the decrease being the number of resources to be removed by the committed or failed command;

the determination of the second number comprising receiving a counter value from the combined command counter for providing said counter value as the second number of resources.

11. The computer-implemented method of claim 1, the determination of the second number comprising:

subtracting the second number from the first number for computing a subtraction result; and based on a determination that the subtraction result is zero or negative, determining that the received command will remove the last existing resource or determining that the received command will add a first resource to the database; and based on a determination the subtraction result is positive, determining that the received command will not remove the last existing resource and will not add the first resource to exist to the database.

12. The computer-implemented method of claim 1, the method comprising using a data source for providing the first number irrespective of whether the data source correctly indicates whether one of the concurrently running further commands has added or removed a resource in the database when the first number is determined and before said further command has committed.

13. The computer-implemented method of claim 1, the database management system or an integration module is configured to deny creating a database in response to receiving a CREATE database command and is configured to solely create a database in response to receiving a command for adding a first resource to exist in the database.

14. The computer-implemented method of claim 13, the data source being analysed for determining whether the resource to be added already exists in the database irrespective of a capability of the data source to correctly indicate whether one of the concurrently running further commands has added or removed said resource when the first number is determined and before said further command has committed.

15. The computer-implemented method of claim 1, the database management system being configured for:

automatically, upon a removal of the last resource from the database, drop the database; and/or automatically, upon processing a command for generating a resource in a namespace for which no database exists in the database management system, creating an empty database and generating the resource in the database.

16. The computer-implemented method of claim 15, the method comprising:

buffering a plurality of additional commands received after the received and buffered command, each buffered additional command being configured for adding a new resource in or for removing an existing resource from the database;

performing the determination that the received and buffered command will remove the last existing resource from the database;

upon the determination that the received and buffered command will remove the last existing resource from the database, analyzing all buffered commands for determining whether execution of all buffered commands will cause the number of resources in the database to decrease by at least one resource;

in case of determining that the execution of all buffered commands will cause the number of resources in the database to decrease by at least one resource, performing the received and buffered command that will remove the last existing resource from the database in a modified execution mode, the modified execution mode suppressing the automatic removal of the database by the database management system upon a removal of the last resource from the database.

17. The computer-implemented method of claim 1, the method further comprising:

buffering, by one or more buffering threads, the received command;

buffering, by the one or more buffering threads, a plurality of additional commands received after the received and buffered command, each buffered additional command being configured for adding a new resource to or for removing an existing resource from the database;

performing, by an analytical thread, the determination that the received and buffered command will remove the last existing resource from the database;

upon the determination that the received and buffered command will remove the last existing resource from the database, analyzing, by the analytical thread, all buffered commands for determining whether the execution of all buffered commands will cause the number of resources in the database to decrease by at least one resource;

in case of determining that the execution of all buffered commands will cause the number of resources in the database to decrease by at least one resource, performing, by two or more first worker threads, the ones of the buffered commands configured for adding one or more resources to the database in parallel; and after the last one of the commands performed by the first worker threads has committed, performing, by two or more second worker threads, the ones of the buffered commands configured for removing one or more resources from the database in parallel.

18. The computer-implemented method of claim 1, the received command being one of a set of commands for adding a resource to the database and for removing a resource from the database, the method comprising performing the method of claim 1 for each of the commands of the set, thereby obtaining a shared or exclusive lock for each of the commands, and carrying out the commands in accordance with a starvation-free execution schema.

19. A computer-readable, non-transitory storage medium comprising computer-interpretable instructions which, when executed by a processor, cause the processor to perform a method comprising receiving a command for adding a new resource in or for removing an existing resource from a database managed by a database management system;

buffering the received command, wherein the buffer time is command specific;

acquiring an exclusive lock for the database in response to receiving the command;

in response to obtaining the exclusive lock for the database:

determining a first number of resources, the first number being indicative of the number of resources currently existing in the database;

determining a second number of resources, the second number being indicative of the number of resources subject to concurrently running further commands, the further commands configured for adding a resource to the database or for removing a resource from the database, wherein the second number is operable for subtracting from the first number;

comparing the first number and the second number for determining whether the received command will remove the last existing resource from the database or add a first existing resource to the database;

in response to determining that the received command removes the last existing resource or adds the first resource to the database, obtaining an exclusive lock for the received command;

in response to determining that the received command does not remove the last existing resource or add the first resource to the database, obtaining a shared lock for the received command; and releasing the exclusive lock for the database.

20. A computer system comprising a program module being operatively coupled to a database management system, the database management system managing a database, the computer system comprising:

a memory having computer readable instructions; and a processor for executing the computer readable instructions, the computer readable instructions controlling the processor to perform operations comprising:

receiving a command for adding a new resource in or for removing an existing resource from the database;

buffering the received command, wherein the buffer time is command specific;

acquiring an exclusive lock for the database in response to receiving the command;

in response to obtaining the exclusive lock for the database:

determining a first number of resources, the first number being indicative of the number of resources currently existing in the database;

determining a second number of resources, the second number being indicative of the number of resources subject to concurrently running further commands, the further commands configured for adding a resource to the database or for removing a resource from the database, wherein the second number is operable for subtracting from the first number;

comparing the first number and the second number for determining whether the received command will remove the last existing resource from the database or add a first existing resource to the database;

in response to determining that the received command removes the last existing resource or adds the first resource to the database, obtaining an exclusive lock for the received command;

in response to determining that the received command does not remove the last existing resource or add the first resource to the database, obtaining a shared lock for the received command; and releasing the exclusive lock for the database.

* * * * *